(12) United States Patent
Karisalmi et al.

(10) Patent No.: US 12,297,597 B2
(45) Date of Patent: May 13, 2025

(54) CELLULOSE COMPOSITION

(71) Applicant: KEMIRA OYJ, Helsinki (FI)

(72) Inventors: Kaisa Karisalmi, Espoo (FI); Jaakko Ekman, Espoo (FI); Marko Kolari, Espoo (FI); Satu Ikavalko, Espoo (FI); Boris Dossman, Espoo (FI)

(73) Assignee: KEMIRA OYJ, Helsinki (FI)

( * ) Notice: Subject to any disclaimer, the term of this patent is extended or adjusted under 35 U.S.C. 154(b) by 552 days.

(21) Appl. No.: 17/261,191

(22) PCT Filed: Jul. 19, 2019

(86) PCT No.: PCT/EP2019/069554
§ 371 (c)(1),
(2) Date: Jan. 19, 2021

(87) PCT Pub. No.: WO2020/016429
PCT Pub. Date: Jan. 23, 2020

(65) Prior Publication Data
US 2021/0269980 A1  Sep. 2, 2021

(30) Foreign Application Priority Data
Jul. 19, 2018 (SE) .................... 1850926-5

(51) Int. Cl.
*D21H 11/18* (2006.01)
*C08H 8/00* (2010.01)
(Continued)

(52) U.S. Cl.
CPC ............. *D21H 11/18* (2013.01); *C08H 8/00* (2013.01); *C08L 1/02* (2013.01); *C08L 5/06* (2013.01);
(Continued)

(58) Field of Classification Search
CPC ........ D21H 11/18; D21H 21/19; D21H 21/36; C08H 8/00; C08L 1/02; C08L 5/06; C08L 5/14; C08L 89/00
See application file for complete search history.

(56) References Cited

U.S. PATENT DOCUMENTS 7,939,578 B2 * 5/2011 Wright .................... D01D 5/00
522/74
2010/0189811 A1  7/2010 Baum et al.
(Continued)

FOREIGN PATENT DOCUMENTS

CA        2766294       12/2010
WO     2014202354       12/2014
(Continued)

OTHER PUBLICATIONS

Gilberto Siqueira, Re-dispersible carrot nanofibers with high mechanical properties and reinforcing capacity for use in composite materials, Dec. 8, 2015, Elsevier, p. 51-53 (Year: 2015).*

(Continued)

*Primary Examiner* — Jacob T Minskey
*Assistant Examiner* — Stephen M Russell
(74) *Attorney, Agent, or Firm* — Robin L. Teskin; Baker, Donelson, Bearman, Caldwell & Berkowitz PC

(57) ABSTRACT

The present invention relates to a microfibrillated cellulose composition comprising microfibrillated cellulose originating from agricultural biomass, comprising:
≥30 wt % cellulose,
1-15 wt % pectin,
8-25 wt % hemicellulose,
0-12 wt %, lignin,
0-15 wt % ash, and
0-8 wt % protein,
based on dry solids content of said microfibrillated cellulose; and a biocide composition comprising at least two biocidal
(Continued)

components, wherein the at least two biocidal components are selected from the groups of biocidal components consisting of:
  Group I: compounds with activated halogen atoms,
  Group II: heterocyclic N—S compounds,
  Group III: aldehydes, and
  Group IV: surface active biocidal compounds selected from the group consisting of quaternary ammonium compounds, long-chain alkylamines, guanidines and biguanidines,
  and any combination thereof,
  and the at least two biocidal components are selected from at least two different groups. The present invention further relates to its manufacture, and use in and manufacture of paper and paperboard products.

10 Claims, 1 Drawing Sheet

(51) Int. Cl.
| C08L 1/02 | (2006.01) |
| C08L 5/06 | (2006.01) |
| C08L 5/14 | (2006.01) |
| C08L 89/00 | (2006.01) |
| D21H 21/18 | (2006.01) |
| D21H 21/36 | (2006.01) |

(52) U.S. Cl.
  CPC ............ *C08L 5/14* (2013.01); *C08L 89/00* (2013.01); *D21H 21/18* (2013.01); *D21H 21/36* (2013.01)

(56) References Cited

U.S. PATENT DOCUMENTS

2014/0242191 A1* 8/2014 Kolari .................. A01N 65/00
                                                    424/641
2016/0145805 A1* 5/2016 Kroener ................ D21H 21/36
                                                    162/4

FOREIGN PATENT DOCUMENTS

WO  WO-2014202354 A1 * 12/2014 ............ C08B 15/08
WO     2017174182        10/2017

OTHER PUBLICATIONS

G. Siqueira, Re-dispersible carrot nanofibers with high mechanical properties and reinforcing capacity for use in composite materials, Dec. 8, 2015, Elsevier, p. 51-53 (Year: 2015).*

Guimarães et al. "Cellulose microfibrillated suspension of carrots obtained by mechanical defibrillation and their application in edible starch films." Industrial Crops and Products. Oct. 30, 2016;89:285-94.

Hiasa et al. "Prevention of Aggregation of Pectin-Containing Cellulose Nanofibers Prepared from Mandarin Peel." Journal of Fiber Science and Technology. Jan. 12, 2016;72(1):17-26.

Jongaroontaprangsee et al. "Production of nanofibrillated cellulose with superior water redispersibility from lime residues via a chemical-free process." Carbohydrate polymers. Aug. 1, 2018;193:249-58.

Siqueira et al. "Re-dispersible carrot nanofibers with high mechanical properties and reinforcing capacity for use in composite materials." Composites Science and Technology. Feb. 8, 2016;123:49-56.

* cited by examiner

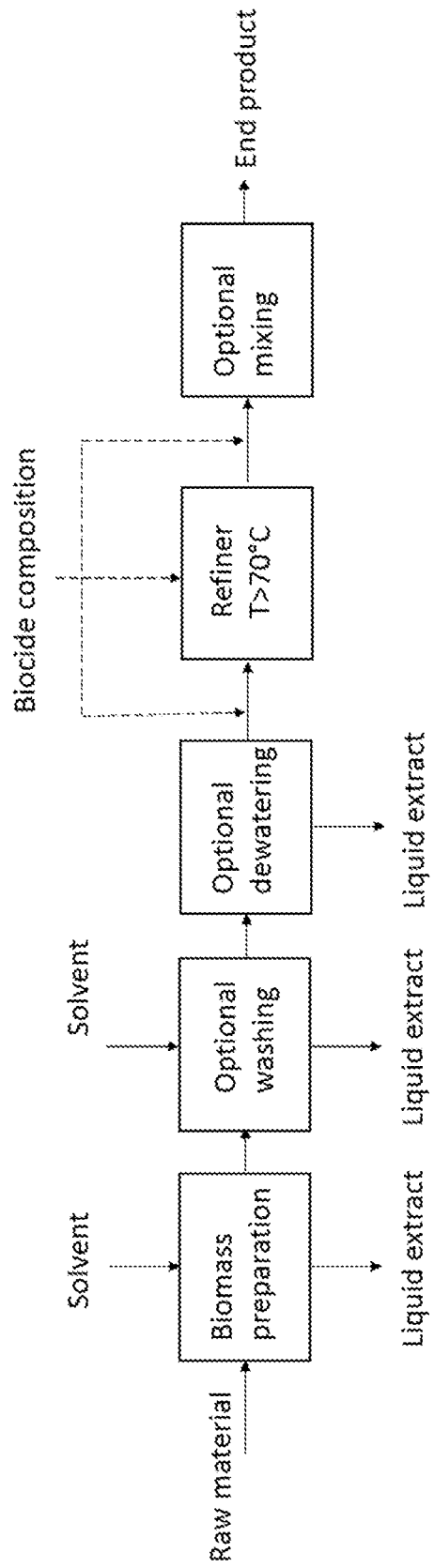

CELLULOSE COMPOSITION

RELATED APPLICATIONS

This application is a U.S. National Phase application of Int'l Appl. No. PCT/EP2019/069554, filed Jul. 19, 2019, which claims priority to Swedish Appl. No. SE 1850926-5, filed Jul. 19, 2018, each of which are incorporated herein by reference in their entireties.

FIELD OF THE INVENTION

The present invention relates to a microbiologically controlled microfibrillated cellulose composition, manufacture thereof and its use in paper making.

BACKGROUND

The use of microfibrillated cellulose in paper making has been known for some time. Most of the research and commercialization efforts have been put on wood based cellulose. However, there is an increasing demand and interest on efficient usage of world's resources and recently more efforts and research has been put into secondary streams from industry. By finding new ways to provide value-adding products or to provide new value-adding products as such, our resources may be used much more efficiently than commonly used.

The food sector in Europe generates millions of tons per year of by-products and waste. Processing of fruits and vegetables, e.g. juice production, generates huge amounts of waste. The pomaces may be used as feed, or fertilizer but a large amount is usually discarded, which is not preferable from an environmental and resource optimization point of view.

Some raw materials may also be considered undesirable for production of value-adding products since they have drawbacks such as too short storage times.

Preventing microbiological degradation in manufacturing of microfibrillated cellulose (MFC) may be difficult as the biocides may be degraded at high temperatures. Thus preservation of wood based MFC, may need to use huge amounts of biocides, to cope with a partial degradation of the biocides and still maintain some active biocides.

When using nutrient rich secondary streams from processing industry in MFC production, the microbiological control and end-product preservation are even more challenging and important than in wood based MFC production and end-products. Non-wood based raw materials contain microbes, and includes nutrients for growth of said microbes, and it is to be noted not all microbes are killed during the processing of the raw materials and manufacturing to provide MFC. As the final MFC product contains nutrients for microbial growth, it is prone to microbial spoilage. Heat resistant bacterial spores are very problematic contaminants, because high amount of those (e.g. >1000 cfu/ml) in a raw material prevents use of MFC in machines producing food packaging board.

SUMMARY OF THE INVENTION

Since the storage and shelf life of compositions comprising MFC with a non-wood origin is too short, a commercial product has not yet been obtainable with known techniques. Thus, it is an aim to use by-products or secondary streams from different agricultural processes which are not presently used for provision of value-adding products. It is further an aim to be able to use less desirable components as feed materials for new processes or products.

The present invention relates to a microbiologically controlled microfibrillated cellulose composition. The present invention relates to provision of microfibrillated cellulose originating from other sources than normally used to provide such materials. The present invention provides a possibility to achieve valorization of agro-industrial biomasses, which may be put to further use in the provision of value-adding products and processes.

The present invention manages to add biocide efficiently and provide a thoroughly dispersed MFC composition. The present biocides used herein provide a good effect on the microbial system of the biomass, and may also be effective against spores, and/or spore forming bacteria therein.

SHORT DESCRIPTION OF THE DRAWINGS

FIG. 1 discloses a schematic drawing of embodiments of the process for preparation of the microfibrillated cellulose composition according to the present invention.

DETAILED DESCRIPTION

The present invention provides a microfibrillated cellulose composition, which include a microfibrillated cellulose originating from agricultural biomass, and a biocide composition. The microfibrillated cellulose composition may additionally contain water. The present microfibrillated cellulose composition is useful as a strength agent in papermaking. Since the present microfibrillated cellulose composition can provide microfibrillated cellulose from non-wood sources, it broadens the possibilities for use of other raw-materials. However, as the biomass raw materials used are not sterile and may contain plenty of biodegradable compounds the microbiology thereof during the processing and of the end-product must be paid attention to. Thus, the microfibrillated cellulose composition according to the present invention provides a solution thereto.

The present invention relates to a microfibrillated cellulose composition comprising, microfibrillated cellulose originating from agricultural biomass, comprising:

≥30 wt % cellulose, such as 50-99 wt %, 50-69 wt %, or 60-90 wt %, 1-15 wt % pectin, such as 1-10 wt %, 1-8 wt %, or 1-5 wt %, 8-25 wt % hemicellulose, such as 8-20 wt %, 8-15 wt %, or 10-20 wt %, 0-12 wt %, lignin, such as 1-12 wt %, 0-10 wt %, 0-8 wt %, or 5-12 wt %, 0-15 wt % ash, such as 1-15 wt %, 0-10 wt %, 0-8 wt % or 1-10 wt %, and 0-8 wt % protein, such as 1-8 wt %, 0-6 wt %, 0-5 wt %, or 1-6 wt %, based on dry solids content of said microfibrillated cellulose; and a biocide composition comprising at least two biocidal components, wherein the at least two biocidal components are selected from the groups of biocidal components consisting of:

Group I: compounds with activated halogen atoms,
Group II: heterocyclic N—S compounds,
Group III: aldehydes, and
Group IV: surface active biocidal compounds selected from the group consisting of quaternary ammonium compounds, long-chain alkylamines, guanidines and biguanidines,
and any combination thereof,
and the at least two biocidal components are selected from at least two different groups. Preferably at least biocidal components of Group I are included. The at least two biocidal components are preferably selected from Group II, and Group I or Group or Group I and Group or Group I and Group IV.

The present invention is related to further use of crops which may have been processed in different manners. Crops may herein be a plant product that can be grown and harvested extensively for profit or subsistence. Crop may refer either to the harvested parts or to the harvest in a more refined state (husked, shelled, etc.). The crops have been cultivated by agriculture. Herein the definition of agriculture is limited to plants, and plant-like materials. Thus, herein animal products are excluded. Agriculture is to be interpreted as cultivation of plants and fungi for food, fiber, biofuel, medicinal plants, and other products used to sustain and enhance life.

The crops may be subjected to different processes such as industrial processes to extract or retrieve desirable parts and components from the crops. Any remaining part of the crops may be referred to a biomass, such as an agricultural biomass. It is to be noted that the crop itself, as unprocessed, may also be referred to as a biomass.

The present crops may be fruits, vegetables, grasses, etc.

The present crops are preferably food, and/or feed, crops. It is to be noted that by food and feed crops is herein meant crops that are used for production of food and feed products, and all part of the crop, i.e. the plants, may be included even if only parts of the plants are used for the food or feed material. Thus, all parts, or some parts, of the crops may be used in the present invention. It is to be noted that crops are not to include trees as such with their wooden trunks and bark, but fruits from trees are to be included in the definition of crops. Thus microfibrillated cellulose originating from wood is excluded from the present definition of cellulose containing biomass.

The present crops may contain cellulose in a varying ratio depending on the crop type.

An agricultural biomass, containing either agricultural biomass, or a combination thereof, have a cellulose content. Thus, the biomass may be considered a cellulose-containing agricultural biomass.

As can be understood from the above, the cellulose containing material of the present invention is preferably originating from agricultural crops, which may have been processed such as agricultural by-products, or secondary streams.

The cellulose containing agricultural biomass may be in the form of pomaces, clippings, fragmented, crushed, or beaten matter.

The cellulose containing agricultural biomass may originate from vegetables, fruits, grasses, buckwheat, members of the Fabaceae family, etc. Example may be selected from sugar beet, potato, cassava, sweet potato, parsnip, radish, carrot, ginger, ginseng, onion, and tomato, cranberry, blueberry, apple, pear, and citrus fruits, e.g. orange, lime, lemon, and grapefruit. The peel and pith of fruits may be used. Grass, such as cereal, i.e. any grass cultivated for the edible components of its grain. Grasses may be selected from maize, barley, wheat, oats, rye, sugar cane, and sorghum. Bagasse is the fibrous matter that remains after sugarcane or sorghum stalks are crushed to extract their juice. The cellulose containing agricultural biomass may also be selected from buckwheat; members of the Fabaceae family, e.g. peas, and beans, such as dry beans or soy beans.

Preferably the agricultural biomass originates from components selected from the group consisting of sugar beet, potato, cassava, sweet potato, cereals, and any combination thereof.

The cellulose containing agricultural biomass may be residues, or secondary streams from harvesting; the sugar industry, which processes sugar beet and sugar cane; the starch industry, which processes potatoes and maize; or from any other industry which uses agricultural products for its own interest and produces cellulose containing secondary streams. Examples may be selected from:

harvesting and industrial residues from species such as maize, barley, buckwheat, dry bean, sugar cane, sugar beet, and soybean residues, fruit, berry, or vegetable pomaces from species such as cranberry, blueberry, carrot, tomato, apple, citrus fruits, and pith from species such as sugar cane bagasse, citrus fruits or grapefruits.

The cellulose content of the agricultural biomass may be high, i.e. at least 10 wt % cellulose based on dry solids content, preferably at least 20 wt %. For example, the cellulose content may be about 10-80 wt %, such as 10-70 wt %, 20-70 wt %, 20-65 wt %, 30-65 wt %, 30-60 wt %, based on dry solids content of the biomass. A cellulose content of the agricultural biomass of at least 10 wt % cellulose may be considered a cellulose rich biomass.

Microfibrillar cellulose (MFC) may also be called nanofibrillar cellulose (NFC), nanocellulose, nanofibrillated cellulose, cellulose nanofiber, nano-scale fibrillated cellulose, microfibrillated cellulose, or cellulose nanofibrils (CNF). The words may be used interchangeably herein. The size of the MFC fibers may vary depending on the specific manufacturing process.

The microfibrillated cellulose material is obtained as cellulose microfibrils or cellulose microfibril bundles. The length of the microfibrils in the microfibrillated material is typically >1 μm, preferably 1-200 μm, even more preferably 10-100 μm, most preferably 10-60 μm. The diameter of individual microfibrils may be in the range of 2-200 nm, preferably 2-100 nm, more preferably 4-70 nm, even more preferably 5-40 nm. Microfibrillated cellulose material may often comprise bundles of 10-50 microfibrils, the diameter of microfibril bundles being normally <1 μm.

The present microfibrillated cellulose composition comprises a microfibrillated cellulose, which originates from agricultural biomass, preferably comprising at least 10 wt % of cellulose, based on dry solids content of said biomass; and a biocide composition. The microfibrillated cellulose composition may further contain components selected from the group other carbohydrate polymers, such as hemicellulose and pectin; lignin; proteins; and fats originated from the agricultural raw-material. An embodiment of the present microfibrillated cellulose composition comprises at least 30 wt % cellulose, 1-15 wt % pectin, 8-25 wt % hemicellulose, 0-12 wt % lignin, 0-15 wt % ash, and 0-8 wt % protein, based on dry solids content of said composition.

The present microfibrillated cellulose composition may have a cellulose content of at least 30 wt %, such as 30-99 wt %, 50-99 wt %, 60-90 wt %, 40-69 wt %, 45-69 wt %, 45-65 wt %, 50-69 wt %, 50-65 wt %, 50-60 wt %, 55-69 wt %, 55-65 wt %, or 60-69 wt %, based on dry solids content of the microfibrillated cellulose composition. The amount of hemicellulose is 8-25 wt %, and may be in the range of 8-20 wt % such as 8-18 wt %, 8-15 wt %, 10-18 wt %, 10-20 wt %, 10-15 wt %, 12-18 wt %, or 14-16 wt %, based on dry solids content of said composition. The amount of pectin is 1-15 wt %, and may be in the range of 1-10 wt %, 1-8 wt %, 1-7 wt % 1-5 wt %, 5-10 wt %, 1-3 wt %, or 1-2 wt %, based on dry solids content of said composition. The amount of lignin is 0-12 wt %, and may be in the range of 1-12 wt %, 0-10 wt %, 5-12 wt %, 1-10 wt %, 5-10 wt %, 0-8 wt %, 5-8 wt %, or 0-5 wt %, based on dry solids content of said composition. The amount of ash is 0-15 wt %, and may be in the range of 1-15 wt %, 0-10 wt %, 1-10 wt %, 5-10 wt %, 0-8 wt %, 5-8 wt %, or 0-5 wt %, based on dry solids content of said composition. The amount of protein is 0-8 wt %, and may be in the range of 1-8 wt %, 0-6 wt %, 1-6 wt %, 0-5 wt %, 2-5 wt %, 0-4 wt %, 2-4 wt %, or 0-3 wt %, based on dry solids content of said composition.

The microfibrillated cellulose composition may comprise 50-69 wt % cellulose, 1-10 wt % pectin, 8-15 wt % hemicellulose, 0-5 wt %, lignin, 0-5 wt % ash, and 0-4 wt % protein, based on dry solids content of said composition.

The microfibrillated cellulose composition may comprise 55-65 wt % cellulose, 1-7 wt % pectin, 8-15 wt % hemicellulose, 0-5 wt %, lignin, 0-5 wt % ash, and 0-3 wt % protein, based on dry solids content of said composition.

The microfibrillated cellulose composition may comprise:
1) microfibrillated cellulose originating from agricultural biomass, said microfibrillated cellulose comprising 50-69 wt % cellulose, such as 50-65 wt % or 55-65 wt %; 1-15 wt % pectin, such as 1-10 wt % or 1-7 wt %; 8-25 wt % hemicellulose, such as 8-20 wt % or 8-15 wt %; 0-12 wt %, lignin, such as 0-10 wt % or 0-5 wt %; 0-15 wt % ash, such as 0-10 wt % or 0-5 wt %; and 0-8 wt % protein, such as 0-6 wt %, 0.4 wt %, or 0.3 wt %, based on dry solids content of said microfibrillated cellulose; and
2) a biocide composition comprising at least two biocidal components, wherein the at least two biocidal components are selected from:
Group I: compounds with activated halogen atoms, and Group II: heterocyclic N—S compounds, respectively; optionally said biocide composition comprising at least two biocidal components may include at least one other biocidal component selected from one of said two Groups I or II, or selected from the groups of biocidal components consisting of Group III: aldehydes, and Group IV: surface active biocidal compounds selected from the group consisting of quaternary ammonium compounds, long-chain alkylamines, guanidines and biguanidines, and any combination thereof;
Group I: compounds with activated halogen atoms, and Group III: aldehydes, respectively; optionally said biocide composition comprising at least two biocidal components may include at least one other biocidal component selected from one of said two Groups I or III, or selected from the groups of biocidal components consisting of Group II: heterocyclic N—S compounds, and Group IV: surface active biocidal compounds selected from the group consisting of quaternary ammonium compounds, long-chain alkylamines, guanidines and biguanidines, and any combination thereof; or
Group I: compounds with activated halogen atoms, and Group IV: surface active biocidal compounds selected from the group consisting of quaternary ammonium compounds, long-chain alkylamines, guanidines and biguanidines, and any combination thereof, respectively; optionally said biocide composition comprising at least two biocidal components may include at least one other biocidal component selected from one of said two Groups I or IV, or selected from the groups of biocidal components consisting of Group II: heterocyclic N—S compounds, and Group III: aldehydes.

The microfibrillated cellulose composition may have a dry solids content of 15-99.9 wt %, such as 20-95 wt %, 25-90 wt %, 30-90 wt %, 30-95 wt %, 50-99 wt %, 55-99 wt %, or 60-95 wt %, based on the microfibrillated cellulose composition. The solids content may successfully be raised above 20 wt %, such as at least 23 wt % or 25 wt %, based on the microfibrillated cellulose composition. The handling of an MFC product having a solids content of 50-99 wt % is easier due to less stickiness, and such high content MFCs are free-flowing materials and can be made down by simple make-down units.

According to the present invention biocides may quite easily be well distributed into, and throughout the microfibrillated cellulose composition, despite the high solids content of the microfibrillated cellulose composition and the small amount of biocide used in comparison.

The raw material to provide the microfibrillar cellulose of the composition may be clippings, pomaces, and/or beaten agricultural material, which provides the agricultural biomass. Thus, the starting material may be considered as microbiologically active due to the high content of nutrients for microbes and other undesirable or detrimental organisms. The present invention has also been proven efficient against spores which generally are considered organisms which are difficult to eliminate or render harmless.

The present invention includes the use of a biocide. Biocide is herein to be interpreted as a chemical substance intended to destroy, deter, render harmless, and/or exert a controlling effect on any harmful organism by chemical means. A biocide may be a substance that destroys or inhibits the growth or activity of living organisms, irrespectively of vegetative or sporal form thereof. It is of importance herein not only to kill the microorganisms, which may be selected from viruses, bacteria, fungi, and molds, including spores, but also to prevent a new growth of said undesirable organisms, also including new possible contaminations. A biocide may be selected from a bactericide, a fungicide, a virucide, a sporicide, a disinfectant, an antiseptic, and a preservative. The bactericide may also have sporicidal properties. The biocide may preferably be selected from bactericides, fungicides, and preservatives. A biocide may be effective within more than one of the above mentioned areas, and thus be considered to have several of the mentioned effects in combination. The present biocide is preferably efficient against spore forming bacteria, inhibit the development of any spores into vegetative form, and prevent formation of spores, which may be present in or drawn to the nutrient and cellulose containing biomass.

As a result of use of biocides according to an embodiment of the invention, one or more effects at least of the following may preferably be gained: decreasing or preventing spore formation, inhibiting development of spores into vegetative form, stable pH during the storage of microfibrillated cellulose composition, especially preventing significant pH drop, preventing bad smell of the MFC composition or formation of mold.

The biocide used may have different effects depending on the origin of the cellulose containing agricultural biomass. There may be a difference in biocide efficiency depending on the origin of the cellulosic material used.

Different microorganisms can enter the process via the raw materials and efficacy of a single biocidal active may not be effective enough against all different species of microorganisms. During the manufacturing process of the microfibrillated cellulose composition or the manufacturing process of the paper or paper board there are different physical and chemical conditions, such as different temperatures, different pH values, and different flow conditions (such as high shear and stagnant conditions). Some parts of the processes are well mixed and aerated, whereas during storage of the microfibrillated cellulose composition or a pulp furnish provided with said microfibrillated cellulose composition, the stagnant material can turn anaerobic. Due to all these factors, a single biocidal active might not be sufficient. A biocidal combination with several different biocidal actives having different chemical structures, and thus different chemical behavior, was found to be effective in controlling the processes with stages of different conditions.

The biocide composition may be at least a two-component biocide, such as a three-component biocide, or a four-component biocide. This means that the biocide comprises at least two, three or four biocidal components, e.g. two, three or four biocidal substances, respectively. As it is a target to kill, inhibit, and control microbiological activity of the microfibrillated cellulose composition, a combination of different biocides may be needed. The present microfibrillated cellulose composition provides killing of microbes present in or drawn to the MFC composition, and inhibit growth or reformation of microbes present in or drawn to the MFC composition. A combination which is effective against at least one of aerobic or anaerobic bacteria, spores, molds, and fungi is needed. The biocide composition may comprise biocidal components which all have different efficiency and working mechanisms. The biocide composition may comprise biocidal components selected from components immediately killing growth, components having a prolonged killing period using slower mechanisms than the one which kills immediately, and components having a prolonged killing period using even slower mechanisms than the previous substance mentioned and acts as a preservative. Thus, the biocide composition may comprise one biocidal component that immediately kills the undesirable growth, and one biocidal component which is slower in mechanism and acts as a preservative. For example, the biocide composition may comprise one biocidal component that immediately kills the undesirable growth, one biocidal component which is a little bit slower in its mechanism, and one biocidal component which is even slower in mechanism than the last substance and acts as a preservative. The biocide composition may comprise at least two biocidal components, such as at least three or at least four biocidal components, with more than one functional mechanism. As mentioned the biocidal components may have different functional mechanisms. If two biocidal components, they may be selected from different groups, i.e. of Groups I-IV. If three biocidal components, they may be selected from at least two different groups, preferably from three different groups, i.e. of Groups I-IV. If four biocidal components, they may be selected from at least three different groups, preferably from four different groups, i.e. of Groups I-IV.

The biocide composition may comprise biocidal components selected from components targeting different cell constituents of microorganisms. E.g. some biocides aggressively destroy (all) oxidizable components, some are selectively reacting with proteins and some make cell membranes to leak.

Biocidal components of Group I may e.g. destroy oxidizable components.

Biocidal components of Group II may e.g. effect the metabolism of the microorganisms, and may e.g. have preservative properties.

Biocidal components of Group III may e.g. effect the metabolism of the microorganisms, and may e.g. selectively react with components of the cells such as proteins.

Biocidal components of Group IV biocidal components may e.g. make cell membranes leak.

Preferably a combination of different biocidal components is used.

The stability of a biocidal component may also be of importance.

Depending on where in a process a biocide composition is added, different biocides may be chosen according to the invention. If a biocide is to be added to a process step which have a relatively high temperature, a biocide sufficient to cope with said temperature is preferable to use. The biocidal component may be added simultaneously or separately. The biocide composition may be capable of withstanding decomposition or have a very low decomposition impact at a temperature of at least 50° C., such as at least 55° C., at least 60° C., at least 65° C., or at least 70° C. Otherwise, a biocide composition may be added to a different process step not having as high temperature so that it would influence the performance of the biocide negatively, or the processing step which have a relatively high temperature may be provided with a cooling device to control the temperature within desirable temperature ranges, such as at most 50° C., or 45° C.

The present microfibrillated cellulose composition comprises a biocide composition comprising at least two biocidal components,
wherein the at least two biocidal components are selected from the groups of biocidal components consisting of:
Group I: compounds with activated halogen atoms,
Group II: heterocyclic N—S compounds,
Group III: aldehydes, and
Group IV: surface active biocidal compounds selected from the group consisting of quaternary ammonium compounds, long-chain alkylamines, guanidines and biguanidines,
and any combination thereof,
and the at least two biocidal components are selected from at least two different groups. The at least two different groups are preferably selected from Group II, and Group I or Group III; or Group I, and Group III or Group IV.

The biocidal components of Group I may be selected from the group consisting of bromonitrilopropionamides, (tri) chloromethylsulphones, chlorocyanovinylphenylsulphones, bromonitropropan(di)ols, bromonitroacetamides, chlorodithiolones, and any combination thereof; preferably selected from the group consisting of 2,2-dibromo-3-nitrilopropionamide (DBNPA), bis(trichloromethyl)sulphone, (2-chloro-2-cyanovinyl)-phenylsulphone, 2-bromo-2-nitro-propan-1-ol (BNP), 2-bromo-2-nitropropane-1,3-diol (Bronopol), 2,2-dibromo-2-nitroacetamide and 4,5-dichloro-3H-1,2-dithiol-3-one, and any combination thereof; more preferably selected from the group consisting of 2,2-dibromo-3-nitrilo-propionamide, 2-bromo-2-nitropropane-1,3-diol, and any combination thereof.

The biocidal components of Group II may be selected from the group consisting of alkylisothiazolinones, which may be substituted or unsubstituted with halogen, e.g. chloro-containing, benzisothiazolinones, thiazolbenzimidazoles, thiocyanomethylthiobenzthiazoles, 2-Mercaptobenzothiazole(A)↔Benzothiazolin-2-thione(B), and any combination thereof; preferably selected from the group consisting of 2-Methyl-4-isothiazolin-3-one (MI), 5-Chloro-2-methyl-4-isothiazolin-3-one (CMI), 2-n-Octyl-4-isothiazolin-3-one (OI), 4,5-Dichloro-2-(n-octyl)-4-isothiazolin-3-one (OI), 1,2-Benzisothiazolin-3-one (BIT), 2-(1,3-Thiazol-4-yl)benzimidazole (TBZ), 2-Mercaptobenzothiazole(A)↔Benzothiazolin-2-thione(B) (MBT), 2-(Thiocyanomethylthio)benzthiazole (TCMBT), and any combination thereof; more preferably selected from the group consisting of 2-Methyl-4-isothiazolin-3-one (MI), 5-Choloro-2-methyl-4-isothiazolin-3-one (CMI), 2-n-Octyl-4-isothiazolin-3-one (OI), 1,2-Benzisothiazolin-3-one (BIT), 2-Mercaptobenzothiazole(A)↔Benzothiazolin-2-thione(B) (MBT), and any combination thereof; more preferably selected from the group consisting of 2-Methyl-4-isothiazolin-3-one (MI), 5-Choloro-2-methyl-4-isothiazolin-3-one (CMI), 2-n-Octyl-4-isothiazolin-3-one (OI), 1,2-Benzisothiazolin-3-one (BIT), and any combination thereof. Mercaptobenzothiazole(A) ↔Benzothiazolin-2-thione(B) discloses a tautomeric compound which may have both structures.

The biocidal components of Group III may be selected from the group consisting of glutaraldehyde, formaldehyde, and any combination thereof, preferably glutaraldehyde.

The biocidal components of Group IV may be selected from the group consisting of N-Alkyl($C_8$-$C_{18}$)—N,N-dimethyl-N-benzylammonium chloride (i.e. Benzalkonium chloride), Di-n-decyl-dimethylammonium chloride (DDAC), Dioctyl-dimethylammonium chloride, Polymeric quaternary ammonium compounds, Dodecylamine, Bis(3-aminopropyl)dodecylamine, poly(hexamethylenebiguanide) hydrochloride (PHMB), dodecylguanidine hydrochloride (DGH), and any combination thereof; more preferably selected from the group consisting of N-Alkyl($C_8$-$C_{18}$)—N,N-dimethyl-N-benzylammonium chloride (i.e. Benzalkonium chloride), Di-n-decyl-dimethylammonium chloride (DDAC), Dodecylamine, dodecylguanidine hydrochloride (DGH), and any combination thereof; more preferably selected from the group consisting of N-Alkyl($C_8$-$C_{18}$)—N,N-dimethyl-N-benzylammonium chloride, Di-n-decyl-dimethylammonium chloride (DDAC), dodecylguanidine hydrochloride (DGH); and any combination thereof.

Preferably the biocide composition comprises biocidal components selected from at least two of the groups mentioned above, more preferably from at least three of the groups mentioned above. The biocide composition may comprise compounds selected from Group II, and Group I or III, or Group I, and Group III or IV. The biocide composition may comprise compounds selected from Group I, II, and Group I, II, and IV; or Group I, Ill, and IV. The biocide composition may comprise compounds selected from all four groups Group I-IV. Preferably the most preferred compounds of each group I-IV are the compounds selected and combined according to the present invention.

Preferably at least one biocidal component is selected from Group I, e.g. in combination with at least one biocidal component selected from Group II, III or IV, or any combination thereof.

The biocide composition may be present in the amount of 5-200 mg biocidal components, i.e. as biocidal actives, per kg of the microfibrillated cellulose composition. In the present unit the microfibrillated cellulose composition includes any water present in said composition and is not to be interpreted as dry solids of the microfibrillated cellulose composition. Due to a combination of biocides the total amount used may be lowered. The biocide composition may be present in an amount of 10-180 mg/kg, such as 13-150 mg/kg, 15-120 mg/kg, 20-100 mg/kg, or 50-80 mg/kg, of the microfibrillated cellulose composition, calculated on biocidal components, i.e. biocidal actives. It is to be noted that the present amounts of biocide are very low compared to known applications. The present low amounts of biocide composition are an advantage. It is desirable to reduce the amount of biocides due to their characteristics, costs, and for environmental purposes. The level of the dosing may be dependent on the desired functionality, such as preservation time, and origin of the cellulose-containing biomass. The solids content of the microfibrillated cellulose composition may be as indicated above, e.g. 5-95 wt %, 10-80 wt % or 10-50 wt %.

The biocide composition is used to control the growth of microbes and/or spores. The biocide composition may be used to control the growth and/or spreading of organisms selected from the group consisting of bacteria; virus; fungi; molds; spores, such as heat resistant bacterial spores; and any combination thereof. It is desirable to eliminate, reduce, and inhibit the spreading of spores, such as heat resistant bacterial spores.

The present invention may also be using the biocide composition to destroy, deter, render harmless, or exert a controlling effect on any harmful organism by chemical or biological means.

The present microfibrillated cellulose composition may be storage stable for up to 90 days, such as about 1-90 days, at a temperature of about 25° C. The storage stability of the microfibrillated cellulose composition may be about 5-90 days, e.g. 10-80 days, or 20-70 days, at a temperature of about 25° C. The present microfibrillated cellulose composition may be stored up to 150 days at +4° C.

The present microfibrillated cellulose composition may be obtained by a method of manufacturing, comprising the steps of;

providing an agricultural biomass comprising at least 10 wt % of cellulose, based on dry solids content of said biomass;

optionally providing water;

subjecting said biomass to refining to obtain fibrillation, and provide a microfibrillated cellulose; and providing a biocide composition to said biomass before, during, and/or after the refining, to provide the microfibrillated cellulose composition. If the addition of biocide composition is performed before or during the refining the microfibrillated cellulose composition including the biocide composition will be efficiently processed and mixed into the composition to provide as homogenous microfibrillated cellulose composition as possible. If the addition of biocide composition is performed after the refining, it may be needed to include a mixing step after said addition of biocide composition, in order to provide a sufficiently mixed composition to provide as homogenous microfibrillated cellulose composition as possible.

The word "fibrillation" refers to a process. Refining can be defined as subjecting a fiber slurry, such as a cellulose containing biomass, to shearing and compression forces.

One of the things that happens during refining of fibers is fibrillation, the partial delamination of the cell wall, resulting in a microscopically hairy appearance of the wetted fiber surfaces. The "hairs" are also called fibrils. Fibrillation tends to increase the relative bonded area between fibers after the paper has been dried.

The present manufacturing method may provide the refining by using a continuous, a semi-continuous, and/or a batch refining unit.

The refining unit may be selected from the group consisting of a beater; a refiner such as a conical refiner or, a disk refiner; a mill; a rotor-rotor mixer; a rotor-stator mixer; and any combination thereof. Beaters and conical refiners may be found as batch refiners, and continuous disk refiner is a continuous refiner.

The fibrillation of the refining step may as disclosed be performed using a mechanical treatment step. Such a treatment step may also be referred to as homogenisation.

The refining step may further include efficient mixing. This may ensure proper mixture of any biocide composition added to the biomass being treated.

The refining step may be preceded additional treatment steps that aims at loosening the structure of the material, which allows for decreased energy amount needed to be used in the fibrillation step. The refining step may be preceded treatment steps selected from the group consisting of oxidation, extraction, washing, and any combination thereof. After the refining, the microfibrillar composition may be allowed to cool, at least partially. At least partial cooling may be preferable if biocide is to be added after the refining, as it may enable for more types of biocides to be used in the present method.

The refining is performed at a cellulose content of at least 30 wt %, such as 30-99 wt %, 40-90 wt %, or 50-85 wt %, based on dry solids content of the microfibrillated cellulose composition. The cellulose content of the microfibrillated cellulose in the composition may also be referred to as refining concentration.

The refining may be performed under temperature control. The temperature during the refining may be at least 50° C., such as 50-80° C., 50-70° C., or 55-70° C. As mentioned previously, preferably temperature stable biocides are used if the biocide is added before or during the refining. Another option would be to cool the refining step, and thereby enable a temperature during the refining of at most 50° C., such as at most 45° C., or at most 40° C.

The refined material may after refining be further processed e.g. dried to a desired solids content, which is higher than in the refiner. Solids contents of up to 99 wt % is obtainable. Any conventional dryer is applicable for this application. If the microfibrillated cellulose composition has passed the refining step and only has been dewatered thereafter, it may have a solids content of about 11-99 wt % based on dry solids content of the microfibrillated cellulose composition; such as 11-50 wt % wt %, 15-45 wt %, 20-40 wt %, or 25-35 wt %. If the microfibrillated cellulose composition has passed the refining step and been both dewatered and dried, it may have a solids content of about 30-99.9 wt % based on dry solids content of the microfibrillated cellulose composition; such as 30-99 wt %, 35-99 wt % 40-90 wt %, 40-85 wt %, 45-80 wt %, 50-75 wt %, or 50-99 wt %.

FIG. 1 schematically shows embodiments of the invention. Biomass may be obtained as a secondary streams agricultural-treating processes or it may be prepared from agricultural plants which may be treated to provide biomass in a desired form, e.g. by subjecting raw materials to a mechanical treatment and/or to a solvent and extracting the desired biomass. Biomass may be diluted with additional water before proceeding in the process. Further, the biomass may be subjected to a washing step using a solvent, e.g. water. The biomass may additionally be subjected to a dewatering step before the refining step. The refining step may provide a temperature of over 50° C., such as over 70° C., in said step. The biocide composition may be added before, during and/or after refining as is indicated by the dotted line in the drawing. If the biocide composition is added after the refining step, it is preferable to have a mixing step after the refining step.

The present microfibrillated cellulose composition may be included in a stock of fibers. The stock of fibers may be used in the manufacture of paper and paperboard products.

The present microfibrillated cellulose composition may be used in the manufacturing of a paper or paperboard product. Herein is also included a paper or paperboard product comprising present microfibrillated cellulose composition. The present paper or board product may be selected from fine papers, printing paper, towels, tissues, and packaging materials, such as a food packaging materials. Tissue is herein included into paper product.

Paper manufacturing may be divided into several sections. Pulp is provided. The pulp may be refined and/or may be mixed in water, e.g. with other additives, to make a pulp furnish. The pulp furnish may be provided as a wet web, water is drained from the web, the wet paper sheet may go through presses and dries, and finally rolled into large rolls.

"Pulp" refers typically to a fibrous cellulosic material. The pulp may also refer to cellulosic fibers, non-cellulosic polymeric fibers, or any combinations thereof. Suitable cellulosic fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemo thermochemical pulp (CTMP), alkaline peroxide mechanical pulp (APMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used. In addition to cellulosic fibers, or instead of them, the pulp may comprise non-cellulosic polymeric fibers, such as fibers of polyethylene, polypropylene, or polyester, in the form of e.g. single component or bicomponent fibers.

"Pulp furnish" refers to a mixture of pulp and water. The pulp furnish may also be referred to as pulp slurry herein. The pulp furnish is prepared in practice using water, which can be partially or completely recycled from the paper machine. The water may be selected from the group white water, fresh water, or other process water e.g. provided within the pulp industry, and a mixture of such water qualities. The pulp furnish may contain interfering substances, such as fillers. The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers. The aqueous pulp furnish may comprise recycled and/or virgin fibers.

Herein is provided a method of making a paper product comprising:

providing an aqueous pulp furnish, draining the aqueous pulp furnish to form a wet fiber web, and drying the wet fiber web to obtain the paper or paperboard product; and further comprising addition of the present microfibrillar cellulose composition to the aqueous pulp furnish or on the wet web.

Optionally at least one cationic additive may be added to the aqueous pulp furnish or on the wet web, simultaneously or subsequent of said microfibrillar cellulose composition. The cationic additive may be added to the aqueous pulp furnish in an amount of about 1-20 kg additive/ton pulp furnish, preferably about 2-15 kg/ton, preferably 3-10 kg/ton, based on dry solids content per ton of dry solids of pulp furnish.

The microfibrillated cellulose composition may be added to the aqueous pulp furnish in an amount of about 1-100 kg microfibrillated cellulose composition/ton pulp furnish, such as about 1-70 kg/ton, 1-50 kg/ton, 3-50 kg/ton, 4-40 kg/ton, 4.5-40 kg/ton, 5-40 kg/ton, 5-70 kg/ton, 6-36 kg/ton, 8-34 kg/ton, 10-50 kg/ton, 10-32 kg/ton, 10-30 kg/ton, or 15-50 kg/ton, based on dry solids content of the microbrillated cellulose composition per ton of dry solids of pulp furnish.

The present microfibrillated cellulose composition may be used as a strength additive in the manufacture of paper or paperboard products.

EXAMPLES

Example 1

Raw-Material: Dried Cellulose Rich Side-Stream Originated from Potato

One potato-originated microfibrillated cellulose sample was prepared. No biocide was added. The sample were stored at +4° C. approximately two weeks before the test was started.

Sample was divided to 500 ml aliquots. Biocides were diluted to 10% solutions (of product) and added to samples at concentrations of Table 1 Microbe cultivations were done after 1 h of exposure. After the first cultivations the samples were stored at 60° C. for 1 day.

After 1 day at 60° C. the samples were cooled down to room temperature. Microbe cultivations were done (=1 d results). After this a re-challenge was performed by adding contaminated material (0.5% of the volume) from the untreated reference bottle. Storing of samples was continued at 30° C. After the re-challenge the follow up measurements were done after 2 weeks, 1 month and 2 months.

After 2 months at 30° C. a second re-challenge was performed with the same procedure as previously. After this second re-challenge storing of samples was continued at 30° C. Follow up measurements were done after 3, 4, 5 and 6 months (of total storage time).

TABLE 1

Biocides used and their concentrations in example 1

| Test point | Biocide composition | Dosage, mg/kg (total amount of biocidal actives in biocide composition) |
|---|---|---|
| 1. | none | none |
| 2. | DBNPA + Bronopol + CMIT/MIT | 40 |
| 3. | DBNPA + Bronopol + CMIT/MIT | 100 |
| 4. | Glutaraldehyde + CMIT/MIT | 80 |
| 5. | Dazomet | 150 |
| 6. | Dazomet | 400 |
| 7. | BIT + Zinc pyrithione | 18 |
| 8. | BIT + Zinc pyrithione | 45 |

Dazomet is 3,5-Dimethyl-1,3,5-thiadiazinane-2-thione.

TABLE 2

Number of aerobic bacteria in potato-originated microfibrillated cellulose (cfu/g). The bacteria were cultivated on plate count agar at +30° C. degrees.

| Test point | 1 h | 1 d | 2 w | 1 m | 2 m | 2 m + 1 d | 3 m | 4 m | 5 m | 6 m |
|---|---|---|---|---|---|---|---|---|---|---|
| 1. | $73 \times 10^6$ | $9 \times 10^6$ | $14 \times 10^5$ | $1 \times 10^6$ | $4 \times 10^6$ | $21 \times 10^6$ | $3 \times 10^6$ | $3 \times 10^6$ | $2 \times 10^6$ | $8 \times 10^6$ |
| 2. | 4 800 | $5 \times 10^4$ | 2 000 | 800 | $32 \times 10^4$ | 300 | 5000 | 2 700 | 300 | 700 |
| 3. | 3 100 | 300 | 2 600 | 2 300 | 2 400 | <100 | 2800 | 2 500 | 400 | 500 |
| 4. | 3 000 | 200 | <100 | 100 | <100 | <100 | <100 | <100 | <100 | <100 |
| 5. | $100 \times 10^6$ | $20 \times 10^4$ | 700 | 600 | <100 | <100 | 100 | 500 | <100 | $3 \times 10^4$ |
| 6. | $37 \times 10^6$ | $2 \times 10^4$ | 300 | 100 | <100 | <100 | <100 | <100 | <100 | $1 \times 10^4$ |
| 7. | $162 \times 10^6$ | $2 \times 10^4$ | 9 200 | 2 000 | <100 | $35 \times 10^4$ | 100 | <100 | <100 | $2 \times 10^4$ |
| 8. | $260 \times 10^6$ | <100 | 700 | <100 | <100 | <100 | 100 | <100 | <100 | 400 |

TABLE 3

Number of aerobic spores and yeasts and molds in potato-originated microfibrillated cellulose after 6 months storage (cfu/g).

| Test point | Aerobic spores, 6 m | Yeasts, 6 m | Molds, 6 m |
|---|---|---|---|
| 1. | $1 \times 10^4$ | <10 | $2 \times 10^4$ |
| 2. | 110 | <10 | <10 |
| 3. | 490 | <10 | <10 |
| 4. | <10 | <10 | <10 |
| 5. | 20 | <10 | <10 |
| 6. | <10 | <10 | <10 |
| 7. | 60 | <10 | <10 |
| 8. | 40 | <10 | <10 |

Results in Table 2 and 3 demonstrate that biocide combinations of this invention combining biocides from Groups I and II (test points 2 and 3) or from Groups II and III (test point 4) maintained bacterial activity at a very low level up to 6 months.

TABLE 4

Used biocides and their concentrations in example 2

| Test point | Biocide | Dosage, mg/kg (total amount of biocidal actives in biocide composition) |
|---|---|---|
| 1. | none | none |
| 2. | DBNPA + Bronopol + CMIT/MIT | 40 |
| 3. | DBNPA + Bronopol + CMIT/MIT | 100 |
| 4. | Glutaraldehyde + CMIT/MIT | 80 |
| 5. | Dazomet | 150 |
| 6. | Dazomet | 400 |
| 7. | BIT + Zinc pyrithione | 18 |
| 8. | BIT + Zinc pyrithione | 45 |

TABLE 5

Number of aerobic bacteria in sugar-beet-originated microfibrillated cellulose. The bacteria were cultivated on plate count agar at +30° C.

| Test point | 1 h | 1 d | 2 w | 1 m | 2 m | 2 m + 1 d | 3 m | 4 m | 5 m | 6 m |
|---|---|---|---|---|---|---|---|---|---|---|
| 1. | $16 \times 10^6$ | $5 \times 10^6$ | $3 \times 10^6$ | $5 \times 10^6$ | $8 \times 10^6$ | $21 \times 10^6$ | $2 \times 10^6$ | $6 \times 10^6$ | $4 \times 10^6$ | $3 \times 10^6$ |
| 2. | 800 | $10 \times 10^4$ | 1 200 | 200 | 600 | 300 | 200 | 400 | 200 | 100 |
| 3. | $135 \times 10^4$ | $2 \times 10^4$ | 400 | 200 | <100 | <100 | 100 | 100 | 100 | 300 |
| 4. | $1 \times 10^5$ | <100 | <100 | <100 | <100 | <100 | <100 | <100 | <100 | 200 |
| 5. | $13 \times 10^6$ | $1 \times 10^4$ | 300 | 100 | <100 | <100 | $15 \times 10^6$ | $3 \times 10^6$ | $4 \times 10^6$ | $11 \times 10^6$ |
| 6. | $26 \times 10^6$ | <100 | <100 | 100 | <100 | <100 | <100 | 1 100 | $6 \times 10^4$ | $3 \times 10^6$ |
| 7. | $18 \times 10^6$ | $2 \times 10^4$ | 500 | $3 \times 10^6$ | $18 \times 10^6$ | $3.5 \times 10^6$ | $1 \times 10^6$ | $13 \times 10^6$ | $13 \times 10^6$ | $5 \times 10^6$ |
| 8. | $13 \times 10^6$ | 2 200 | 400 | <100 | <100 | <100 | $35 \times 10^6$ | $7 \times 10^6$ | $6 \times 10^6$ | $3 \times 10^6$ |

Example 2

Raw-Material: Dried Pellets of Cellulose Rich Side-Stream Originated from Sugar Beet One sugar-beet-originated microfibrillated cellulose sample was prepared. No biocide was added. The sample were stored at +4° C. approximately two weeks before the test was started.

Sample was divided to 500 ml aliquots. Biocides were diluted to 10% solutions (of product) and added to samples at concentrations of Table 4. Microbe cultivations were done after 1 h of exposure. After the first cultivations the samples were stored at 60° C. for 1 day.

After 1 day at 60° C. the samples were cooled down to room temperature. Microbe cultivations were done (=1 d results). After this a re-challenge was performed by adding contaminated material (0.5% of the volume) from the untreated reference bottle. Storing of samples was continued at 30° C. After the re-challenge the follow up measurements were done after 2 weeks, 1 month and 2 months.

After 2 months at 30° C. a second re-challenge was performed with the same procedure as previously. After this second re-challenge storing of samples was continued at 30° C. Follow up measurements were done after 3, 4, 5 and 6 months.

TABLE 6

Number of aerobic spores and yeasts and molds in sugar-beet-originated microfibrillated cellulose after 6 months storage

| Test point | Aerobic spores, 6 m | Yeasts, 6 m | Molds, 6 m |
|---|---|---|---|
| 1. | $1.7 \times 10^4$ | <10 | 90 |
| 2. | 120 | <10 | <10 |
| 3. | 70 | <10 | <10 |
| 4. | 9 | <10 | <10 |
| 5. | $1 \times 10^4$ | <10 | <10 |
| 6. | $1 \times 10^4$ | <10 | <10 |
| 7. | 1 300 | <10 | <10 |
| 8. | 300 | <10 | <10 |

Results in Table 5 and 6 demonstrate that biocide combinations of this invention combining biocides from Groups I and II (test points 2 and 3) or from Groups II and III (test point 4) maintained bacterial activity at a very low level up to 6 months, whereas all other treatments failed.

Example 3

Raw-Material: Fermented Wet (Never-Dried) Cellulose Rich Clippings Originated from Sugar Beet A batch of microfibrillated cellulose product was produced. Right after production, a biocide composition containing DBNPA, Bronopol and OMIT/MIT was added. The total concentration of the biocide composition, as active biocides, in the microfibrillated cellulose composition was 150 mg/kg. The biocide composition was added into the product with efficient mixing apparatus. The sample was stored at room temperature during the follow-up test. Table 7 contains amounts of microbes in a 1000 kg batch of microfibrillated cellulose composition.

TABLE 7

Number of microbes in microfibrillated cellulose, cfu/g.

| Storage time | Aerobic bacteria | Aerobic spores | Anaerobic bacteria | Anaerobic spores | Yeasts | Molds |
|---|---|---|---|---|---|---|
| 0 d | $3 \times 10^4$ | <100 | <10 | <10 | <10 | <10 |
| 1 w | <100 | <10 | <10 | <10 | <10 | <10 |
| 4 w | <100 | n.a. | <10 | <10 | <10 | <10 |
| 6 w | <10 | <10 | <10 | <10 | <10 | <10 |

The same batch was followed a longer time also at +4° C. after the production. Table 8 contains amounts of microbes in a 1000 kg batch of microfibrillated cellulose composition.

TABLE 8

Number of microbes in microfibrillated cellulose, cfu/g.

| Storage time | Aerobic bacteria | Aerobic spores | Anaerobic bacteria | Anaerobic spores | Yeasts | Molds |
|---|---|---|---|---|---|---|
| 0 d | $3 \times 10^4$ | <10 | <10 | <10 | <10 | <10 |
| 1 w | <10 | <10 | <10 | <10 | <10 | <10 |
| 4 w | <10 | <10 | <10 | <10 | <10 | <10 |
| 6 w | <10 | <10 | <10 | <10 | <10 | <10 |
| 11 w | <10 | <10 | <10 | <10 | <10 | <10 |
| 16 w | <10 | <10 | <10 | <10 | <10 | <10 |
| 21 w | <10 | <10 | <10 | <10 | <10 | <10 |

The chemical composition of all sample in Example 3 was determined (wt % of the composition):
- content of inorganic material (%) was determined via ashing the sample and weighting the residual based on the Tappi Test Methods T 211
- protein w-% was determined using the Kjeldahl nitrogen method and Kjeltec 8400 analyzer
- carbohydrate content, lignin, rhamnan and uronic acids content were determined using UV spectroscopy apparatus (HP 8452A, Ultraviolet-Visible), gravimetric determination and ion chromatography (Dionex ICS-3000 system) after acid hydrolysis of the sample
- determination of structural carbohydrates and lignin in biomass, according to Laboratory Analytical Procedure from National Renewable Energy Laboratory (NREL), of April 2008, revised August 2012, by A. Sluiter et. al, (https://www.nrel.gov/docs/gen/fy13/42618.pdf)

TABLE 9

Chemical composition of the microfibrillated cellulose composition sample

| Sample # | Glucan % | Xylan % | Arabinan % | Galactan % | Mannan % | Rhamnan % | Uronic-acids % | Lignin (Klason + ASL) % | Ash % | Protein % |
|---|---|---|---|---|---|---|---|---|---|---|
| 85 | 60.8 | 3.5 | 5.4 | 2.1 | 2.3 | 0.6 | 1.4 | 9.7 | 6.2 | 4.5 |

The Glucan originates mainly from cellulose, but a small amount may also originate from hemicellulose. Xylan, Arabinan, Galactan and Mannan describe the hemicellulose content. Uronic acids and Ramnan describe the pectin content.

The invention claimed is:

1. A microfibrillated cellulose composition comprising, microfibrillated cellulose originating from agricultural biomass, comprising:
≥30 wt % cellulose,
1-15 wt % pectin,
8-25 wt % hemicellulose,
0-12 wt %, lignin,
0-15 wt % ash, and
0-8 wt % protein,
based on dry solids content of said microfibrillated cellulose; and
a biocide composition comprising at least two biocidal components,
wherein the at least two biocidal components are selected from the groups of biocidal components consisting of:
Group I: compounds with activated halogen atoms,
Group II: heterocyclic N—S compounds,
Group III: aldehydes, and
Group IV: surface active biocidal compounds selected from the group consisting of quaternary ammonium compounds, long-chain alkylamines, guanidines and biguanidines, and any combination thereof,
and the at least two biocidal components are selected from at least two different groups, wherein at least one is selected from Group II and at least one is selected from Group I or Group III,
further wherein the amount of biocidal components in the microfibrillated cellulose composition ranges from 5-200 mg/kg, and
wherein the microfibrillated cellulose composition has a dry solids content of 15-99 wt % based on the total weight of the microfibrillated cellulose composition.

2. The microfibrillated cellulose composition according to claim 1, wherein
the biocidal components of Group I are selected from the group consisting of bromonitrilopropionamides, (tri) chloromethylsulphones, chlorocyanovinylphenylsulphones, bromonitropropan(di)ols, bromonitroacetamides, chlorodithiolones, and any combination thereof;
the biocidal components of Group II are selected from the group consisting of alkylisothiazolinones, benzisothiazolinones, thiazolbenzimidazoles, thiocyanomethylthiobenzthiazoles, 2-Mercaptobenzothiazole(A)↔Benzothiazolin-2-thione(B), and any combination thereof; preferably selected from the group consisting of 2-Methyl-4-isothiazolin-3-one (MI), 5-Chloro-2-methyl-4-isothiazolin-3-one (CMI), 2-n-Octyl-4-isothiazolin-3-one (OI), 4,5-Dichloro-2-(n-octyl)-4-isothiazolin-3-one (DCOI), 1,2-Benzisothiazolin-3-one (BIT), 2-(1,3-Thiazol-4-yl)benzimidazole (TBZ), 2-Mercaptobenzothiazole(A)↔Benzothiazolin-2-thione(B) (MBT), 2-(Thiocyanomethylthio)benzthiazole (TCMBT), and any combination thereof;

the biocidal components of Group III are selected from the group consisting of glutaraldehyde, formaldehyde, and any combination thereof; and the biocidal components of Group IV are selected from the group consisting of N-Alkyl(C8-C18)-N,N-dimethyl-N-benzylammonium chloride (i.e. Benzalkonium chloride), Di-n-decyl-dimethylammonium chloride (DDAC), Dioctyl-dimethylammonium chloride, Polymeric quaternary ammonium compounds, Dodecylamine, Bis(3-aminopropyl)dodecylamine, poly(hexamethylenebiguanide)hydrochloride (PHMB), dodecylguanidine hydrochloride (DGH), and any combination thereof.

3. The microfibrillated cellulose composition according to claim 1, wherein the agricultural biomass originates from crop selected from the group consisting of vegetables, fruits, grass, buckwheat, members of the Fabaceae family, and any combination thereof.

4. The microfibrillated cellulose composition according to claim 1, wherein the biocide composition comprises at least one biocide component from Group II, Group I and Group III.

5. The microfibrillated cellulose composition according to claim 1, wherein the amount of biocidal components in the microfibrillated cellulose composition ranges from 50-80 mg/kg of the microfibrillated cellulose composition.

6. The microfibrillated cellulose composition according to claim 2, wherein:
 (i) the biocidal components of Group I are
  (a) selected from 2,2-dibromo-3-nitrilopropionamide (DBNPA), bis(trichloromethyl)sulphone, (2-chloro-2-cyanovinyl)-phenylsulphone, 2-bromo-2-nitropropan-1-ol (BNP), 2-bromo-2-nitropropane-1,3-diol (Bronopol), 2,2-dibromo-2-nitroacetamide and 4,5-dichloro-3H-1,2-dithiol-3-one, and any combination thereof; or
  (b) selected from the group consisting of 2,2-dibromo-3-nitrilopropionamide, 2-bromo-2-nitropropane-1,3-diol, and any combination thereof; and/or
 (ii) the biocidal components of Group II are
  (a) selected from the group consisting of 2-Methyl-4-isothiazolin-3-one (MI), 5-Choloro-2-methyl-4-isothiazolin-3-one (CMI), 2-n-Octyl-4-isothiazolin-3-one (OI), 1,2-Benzisothiazolin-3-one (BIT), 2-Mercaptobenzothiazole(A)↔Benzothiazolin-2-thione(B) (MBT), and any combination thereof; or
  (b) selected from the group consisting 2-Methyl-4-isothiazolin-3-one (MI), 5-Choloro-2-methyl-4-isothiazolin-3-one (CMI), 2-n-Octyl-4-isothiazolin-3-one (OI), I,2-Benzisothiazolin-3-one (BIT)), and any combination thereof; and/or (iii) the biocidal components of Group III comprise glutaraldehyde; and/or
 (iv) the biocidal components of Group IV are
  (a) selected from the group consisting of N-Alkyl(C8-C18)-N,N-dimethyl-N-benzylammonium chloride (i.e. Benzalkonium chloride), Di-n-decyl-dimethyl-ammonium chloride (DDAC), dodecylguanidine hydrochloride (DGH), Dodecylamine, and any combination thereof; or
  (b) selected from the group consisting of N-Alkyl(C8-C18)-N,N-dimethyl-N-benzylammonium chloride, Di-n-decyl-dimethylammonium chloride (DDAC), dodecylguanidine hydrochloride (DGH) and any combination thereof.

7. The microfibrillated cellulose composition according to claim 1, wherein based on dry solids content of said microfibrillated cellulose,
 (i) the amount of cellulose is 50-99 wt %, the amount of pectin is 1-10 wt %, the amount of hemicellulose is 8-20 wt %; the amount of lignin is 1-12 wt %; the amount of ash is 1-15 wt %; or
 (ii) the amount of cellulose is 60-90 wt %, the amount of pectin is 1-5 wt %, the amount of hemicellulose is 10-20 wt %; the amount of lignin is 5-12 wt %; the amount of ash is 1-10 wt %.

8. The microfibrillated cellulose composition according to claim 1, wherein based on dry solids content of said microfibrillated cellulose,
 (i) the amount of protein is 1-8 wt %; or
 (ii) the amount of protein is 1-6 wt %.

9. The microfibrillated cellulose composition according to claim 1, wherein the amount of biocidal components in the microfibrillated cellulose composition ranges from
 (i) 10-180 mg/kg, or
 (ii) 13-150 mg/kg, or
 (iii) 15-120 mg/kg; or
 (iv) 20-100 mg/kg; or
 (v) 50-80 mg/kg.

10. The microfibrillated cellulose composition according to claim 1, wherein the agricultural biomass originates from one or more crops which are selected from the group consisting of:
 (i) sugar beet, potato, cassava, sweet potato, parsnip, radish, carrot; ginger, ginseng, onion, tomato, cranberry, blueberry, apple, pear, citrus fruits, cereals, peas, beans, and any combination thereof; or
 (ii) sugar beet, potato, cassava, sweet potato, parsnip, radish, carrot; ginger, ginseng, onion, tomato, cranberry, blueberry, apple, pear, citrus fruits selected from the group consisting of orange, lime, lemon, and grapefruit; a cereal selected from the group consisting of maize, wheat, oats, rye, barley, sugar cane, and sorghum; buckwheat; peas; beans selected from the group consisting of dry beans or soy beans; and any combination thereof.

* * * * *